United States Patent [19]

Nyrhilä

[11] Patent Number: 5,732,323
[45] Date of Patent: Mar. 24, 1998

[54] METHOD FOR FABRICATING DIMENSIONALLY ACCURATE PIECES BY LASER SINTERING

[75] Inventor: Olli Juhani Nyrhilä, Åbo, Finland

[73] Assignee: Aktiebolaget Electrolux, Stockholm, Sweden

[21] Appl. No.: 793,929

[22] PCT Filed: Sep. 20, 1995

[86] PCT No.: PCT/FI95/00514

§ 371 Date: Mar. 21, 1997

§ 102(e) Date: Mar. 21, 1997

[87] PCT Pub. No.: WO96/09132

PCT Pub. Date: Mar. 28, 1996

[30] Foreign Application Priority Data

Sep. 21, 1994 [SE] Sweden ................................. 9403165

[51] Int. Cl.$^6$ .......................... B22F 3/10; B22F 7/04
[52] U.S. Cl. ............... 419/2; 419/6; 419/7; 419/47; 419/57
[58] Field of Search ......................... 419/10, 47, 2, 419/6, 7, 57; 428/548

[56] References Cited

U.S. PATENT DOCUMENTS

| | | | |
|---|---|---|---|
| 4,853,514 | 8/1989 | Lemelson | 219/121.12 |
| 4,938,816 | 7/1990 | Beaman et al. | 156/62.2 |
| 5,104,748 | 4/1992 | Mori et al. | 428/674 |
| 5,155,324 | 10/1992 | Deckard et al. | 219/121.64 |
| 5,156,697 | 10/1992 | Bourell et al. | 156/62.2 |
| 5,314,003 | 5/1994 | MacKay | 164/494 |
| 5,316,580 | 5/1994 | Deckard | 118/110 |
| 5,352,405 | 10/1994 | Beaman et al. | 419/45 |
| 5,393,613 | 2/1995 | MacKay | 428/553 |
| 5,431,967 | 7/1995 | Manthiram et al. | 427/555 |
| 5,510,066 | 4/1996 | Fink et al. | 264/40.1 |
| 5,616,423 | 4/1997 | Sanjyou et al. | 428/632 |
| 5,622,769 | 4/1997 | Kozuka et al. | 428/209 |
| 5,637,175 | 6/1997 | Feygin et al. | 156/264 |

FOREIGN PATENT DOCUMENTS

| | | |
|---|---|---|
| 2 220 421 | 1/1990 | United Kingdom . |
| WO 9011855 | 10/1990 | WIPO . |
| WO 9109149 | 6/1991 | WIPO . |
| WO 9210343 | 6/1992 | WIPO . |

OTHER PUBLICATIONS

JOM, Nov. 1993, A. Manthiram, et al: Nanophase Materials in Solid Freeform Fabrication", pp. 66–70.

*Primary Examiner*—Daniel J. Jenkins
*Attorney, Agent, or Firm*—Banner & Witcoff, Ltd.

[57] ABSTRACT

The invention relates to a method for the fabrication of dimensionally accurate metal pieces by sintering a material which, before the sintering, consists of a blend of three pulverous ingredients, of which the first ingredient is in the main an iron-group metal, the second ingredient is in the main copper and phosphorus, and the third ingredient is an alloy of copper and some other metal. The shape of the piece is produced by layer-by-layer freeform selected area laser sintering, wherein a layer of the said powder blend is spread on a base, those regions of the layer which correspond to this cross-sectional surface of the piece are heated by a laser beam to the sintering temperature. Thereafter further successive powder layers are spread one on top of another, and in each layer in turn those areas which correspond to the cross-sectional surface of the piece in that layer are laser sintered. The sintering takes place in a gas atmosphere which contains a chemical compound of some iron-group metal, the compound decomposing at the sintering temperature, in which case the iron-group metal will deposit into those cross-sectional areas of the piece being sintered at a given time.

10 Claims, No Drawings

METHOD FOR FABRICATING DIMENSIONALLY ACCURATE PIECES BY LASER SINTERING

BACKGROUND OF THE INVENTION

1. Technical Field

The invention relates to a method for fabricating dimensionally accurate pieces by sintering a material which, before the sintering, consists of a blend of at least three pulverous ingredients, the first ingredient being in the main an iron-group metal, the second ingredient being in the main copper and phosphorus, and the third ingredient being an alloy of copper and at least one other metal, this powder blend of ingredients containing the third ingredient in the largest amount and both the first ingredient and the second ingredient in lesser amounts.

2. Description of the Related Art

A powder blend of this type, from which it is possible, by sintering, to fabricate with dimensional accuracy metal pieces which do not substantially shrink or expand during the sintering, has been described, for example, in patent EP-0 420 962 B1 (corresponds to publication WO-90/11855). The method according to this patent uses conventional sintering in a furnace, which is a relatively slow process. During this slow process the particles of certain ingredients of the said specific metallic powder blend grow, other ingredients melt or dissolve and thereby shrink, and as a result of this particle growth and diffusion process the overall dimensions of the piece remain unchanged, as described in the publications. Thus the method according to this patent is suitable for use in the fabrication of products which are made in large series, in which case a large quantity of products can be sintered simultaneously if there is need for an economical price for the product. A large production quantity is required also for the reason that it enables investments to be made in furnaces in which the above-mentioned sintering of a large quantity of products simultaneously will be possible. There is also the disadvantage that the method requires a form mold or pattern of a refractory material. In addition, the method according to this patent produces, specifically because of the desired dimensional accuracy, porous pieces, as described in the publication. Since the method according to the patent is intended for the production of, for example, tools in which porosity in general is not of crucial significance, the porosity left in the piece has not been considered important in the patent; dimensional accuracy and surface quality have been regarded as the features of primary importance.

Publications EP-0 542 729, EP-0 538 244, U.S. Pat. No. 5,156,697 and article Manthiram, Bourell, Marcus: "Nanoface Materials in Solid Freeform Fabrication"; JOM, November 1993, pp. 66–70, describe a method in which individual parts are fabricated by sintering powder layers by means of heating produced by laser radiation. According to these publications, this selective laser sintering (SLS) is carried out in the following manner. The point of departure is a computer-designed model which is numerically sectioned into layers of predetermined thickness corresponding to the thickness of the powder layer deposited in connection with the sintering. The shapes corresponding to each calculated layer together make up the final desired shape of the part. The fabrication of the actual part is carried out by depositing on a base a powder layer of the above-mentioned thickness, the layer being made up of some conventional powder blend used in sintering. Thereafter the plane image of this powder layer in the computer memory is allowed to direct the laser beam aimed at the powder layer in such a manner that it scans the surface area corresponding to this cross-sectional surface of the part, sintering this area. Those areas of the powder layer which do not belong to the part will remain non-sintered, since they are not subjected to laser radiation. Thereafter, successive powder layers are introduced, layer by layer, and each of them is sintered in the manner described above, in accordance with the numerical plane image, i.e. the cross-sectional surface of the part, corresponding to the layer concerned, the sintered areas ultimately together forming the desired part, whereafter the sintered part can be detached from the non-sintered powder residue.

In these known laser sintering processes, the powder being sintered is made up in the conventional manner of a first component melting at a high temperature and a second component melting at a lower temperature, which second component melts during the sintering and joins the non-melted particles of the first component to one another. A consequence of such conventional sintering is always considerable shrinkage, the linear shrinkage being typically in the order of 5–15%. The fact that the sintering is carried out by means of a laser beam has no effect on this shrinkage. Even if the powder to be sintered were made up of one powder component, as for example in the sintering of plastics, corresponding shrinkage would occur during the sintering. Thus, by these prior-art laser sintering methods it is indeed possible to fabricate single sintered pieces at reasonable cost, but there is the disadvantage of considerable shrinkage of the piece, normal in sintering, in which case no notable dimensional accuracy is achieved. The article mentioned above, Manthiram, Bourell, Marcus: "Nanoface Materials in Solid Freeform Fabrication", mentions the implementation of the laser sintering described above in a methane-containing atmosphere, whereby a portion of the pure silicon present in the blend is converted to silicon carbide, SiC. This, as far as is known, has at least no substantial effect on the porosity of the piece or on its shrinkage during the sintering. It is to be noted further that, when powder layers which shrink are laser sintered, this shrinking of each new layer relative to the previous layers will cause cumulatively increasing stresses inside the piece being produced. In an extreme case the piece may be broken by these internal stresses.

The articles Birmingham, Tompkins, Marcus, "Silicon Carbide Shapes By Selected Area Laser Deposition Vapor Infiltration" and Richards, Thissell, Marcus, "New Developments in Processing and Control of Selected Area Laser Deposition of Carbon"; SOLID FREEFORM FABRICATION SYMPOSIUM, University of Texas at Austin, Aug. 8–10, 1994, describe the fabrication of pieces by a method in which a laser beam pyrolytically decomposes the gas atmosphere in the target area of the beam, and the products of decomposition infiltrate locally between the non-melted powder particles, forming a matrix which bonds them together. According to the publication, the result is a relatively dense piece even without a secondary heat treatment. In the method described, the reinforcing phase is always silicon carbide SiC, and the powder being sintered does not at all contain a melting component; thus, what is in question is actually not at all sintering but infiltration of a compound depositing out from a gaseous atmosphere into the powder. Thus, since in this method all of the matrix material which bonds the non-melted carbide particles together is introduced from a gas atmosphere, the process is slowed down considerably, as the deposition of a sufficient amount of material from the gas atmosphere takes time. The deposition of the matrix material only from the gas atmosphere presupposes that the non-melting powder will absorb laser radiation well and in a very stable manner, as has been pointed out in the said articles. The matrix material mentioned in the articles is also of a non-melting material, i.e. silicon carbide SiC, and it is formed from tetramethylsilane. Correspondingly, in publication U.S. Pat. No. 4,853,514 it is noted that by means of a laser beam it is possible to deposit material out from a gas atmosphere, but no material suitable for this purpose is mentioned.

SUMMARY OF THE INVENTION

It is therefore an object of the present invention to provide a method by which it is possible to fabricate with dimensional accuracy, i.e. without shrinkage or expansion, pieces mainly of metal by sintering them individually. The object is to obtain a metal alloy, on the one hand because of its good thermal properties and on the other hand in order for the piece to be, when necessary, easily machinable afterwards by conventional methods. By dimensional accuracy is meant here that, if the powder state is compared with the completed sintered piece, the linear dimensional change, i.e. shrinkage or expansion, is less than ±2%, and preferably less than ±0.5%. At best, the dimensional changes should be less than ±0.1%, or as small as possible. Another object of the invention is that the porosity of the sintered metal piece thus obtained be as low as possible and its density be as high as possible. A third object of the invention is such a method which is maximally rapid, and in which thus most of the matrix material bonding the non-melted particles derives from the powder itself. A fourth object of the invention is such a method which is non-sensitive to varying absorption coefficients of the sintering surface. A fifth object of the invention is such a method the piece fabricated by which has a minimal quantity of internal stresses caused by sintering shrinkage. One further object of the invention is such a method in which the other objects described above can be achieved without post-annealing and without a refractory or heat-resistant form mold or pattern.

The disadvantages described above can be eliminated and the objects defined above can be achieved by the method according to the present invention, which is characterized in what is stated in the characterizing clause of claim 1.

The most important advantage of the present invention is that by means of it, when necessary, it is possible, by starting from a numeric model for a piece, to form individual metal pieces which are very accurately in compliance with the desired dimensions and which additionally have a low porosity or, at best, are nearly without pores. At best the dimensional changes from powder state to the completed piece are less than ±0.2%, and a dimensional accuracy of ±0.5% can be achieved with relative ease. Furthermore, the strength and toughness of a metal piece produced by the method according to the invention are good and, when necessary, the piece can also be machined using subtractive machining processes.

The invention is described below in greater detail.

DETAILED DESCRIPTION

In the method according to the present invention for the fabrication of metal pieces, the point of departure is a powder blend, known per se, which has at least three pulverous ingredients. The first ingredient is mainly an iron-group metal, the second ingredient is mainly copper and phosphorus, and the third ingredient is an alloy of copper and at least one other metal. This powder blend of ingredients contains the third ingredient in the largest amount and both the first ingredient and the second ingredient in smaller amounts. According to the invention a piece is fabricated by laser sintering thin layers of this powder blend in a gas atmosphere which contains at least one chemical compound of an iron-group metal, the compound decomposing at the sintering temperature. It has been observed, surprisingly, that, when pieces are laser sintered from this powder blend in such a gas atmosphere, pieces are obtained which have a high dimensional accuracy and at the same time a low porosity. This observation is surprising because, according to prior knowledge, the non-shrinkage of the known blend of three pulverous ingredients during sintering is based specifically on particle growth and diffusion, both of which are slow processes and which thus cannot be assumed to take place during laser sintering, which is a rapid phenomenon. It is thus possible that the effect of the method according to the present invention is based on a phenomenon so far unexplained. Another surprising observation was that according to the invention it is specifically advantageous to carry out laser sintering in a gas atmosphere from which, through pyrolytic decomposition, there is deposited onto the piece being sintered a material which forms a reinforcing phase, i.e. an iron-group metal or metal mixture or alloy which does not melt at the sintering temperature even if the powder blend being sintered contains a matrix-forming melting ingredient, and still a considerable reduction in porosity is achieved. According to the conventional doctrine, porosity may be decreased in sintering by increasing the proportion of the melting matrix material and by lengthening the sintering time, but thereby the shrinkage increases further.

According to the invention, the actual sintering of a metal piece takes place e.g. in a hermetically closed chamber into which the depositing material is introduced in the form of a gas or a vapor from a separate gas source. At the bottom of the chamber there is a table on which the piece is formed.In addition, the chamber has, for example, two carriages movable horizontally, i.e. parallel to the plane of the table. The first carriage contains a source of laser radiation, by means of which the operating laser beam is scanned, in a manner known per se, for example reciprocally and covering the entire powder layer area corresponding to the cross-sectional surface of the piece at a given time. Alternatively, of course, it is possible to use a fixedly located laser and to direct the laser beam onto the cross-sectional surface of the piece by means of a mirror located in the carriage or a tiltable mirror located at a fixed point in the chamber. The movement of the carriage and the laser and/or the mirror is controlled by means of a computer or in some other manner suitable for the purpose. The second carriage has a container for the powder blend, which container can be filled from an outside storage container. The container in the chamber has a nozzle through which the powder can be distributed as a thin layer onto the base and onto any powder layers already thereon, corresponding to the piece. The nozzle may have various means for regulating the thickness of the powder layer and to ensure its evenness.

In the fabrication of a piece, first one thin layer of the powder blend is spread onto the base; the thickness of the layer may be, for example, within a range of 50–500 μm. In the fabrication of one and the same piece, the powder layers successively one on top of another are in general mutually of equal thickness, although varying thicknesses may also be used, for example according to the shapes of the different portions of the piece. Those areas of a spread powder layer which correspond to the cross-sectional surface of the piece at this point are then heated typically in step by step or spot by spot basis to the sintering temperature by scanning with the laser beam. The scanning is implemented in such a manner that one traverse of the laser beam always passes adjacent to the previous traverse, so that a scanned region completely covering the desired surface area is produced, whereby a slice, having the thickness of the powder blend layer, of the piece is formed. Thereafter a new layer of the powder blend is spread on top of the preceding one, and those areas of this new layer which correspond to the cross-sectional surface of this layer of the piece are heated to the sintering temperature in a corresponding manner, traverse by traverse. Thereby a sintered slice, in accordance with this new layer, is obtained of the piece, this slice being also sintered to the previous slice. In this manner the procedure is continued, layer by layer, until the entire piece has been produced in its entire thickness in the orientation perpendicular to the said layers. In general all layers therein are mutually of the same thickness. If varying layer thicknesses are used, the shape of the piece must be divided mathematically, in a manner corresponding to the layer thickness, for purposes of laser control and the control of the spreading of the powder blend. The method described in this paragraph is called selective laser sintering (SLS), and it is a method known per se and is therefore not described in greater detail in the present patent application.

A numeric or other model for the control of the laser in the selective laser sintering described above is produced preferably, for example, by starting from a three-dimensional CAD model which the shape of the piece is divided into cross-sectional surfaces of the piece, located at distances corresponding to the thicknesses of the powder layers, each of the surfaces containing the area depicting the intended substance of the piece. The shape of each cross-sectional area is used for controlling the laser in the sintering of the corresponding powder layer, whereby the powder layer region in accordance with the said cross-sectional surface is sintered. The stack of successively disposed cross-sectional areas will thus form the entire shape of the piece. It is clear that the sintered area of each powder layer can also be determined by using some other technique. What is essential is, however, that the shapes of the cross-sectional surfaces of the piece, corresponding to the layers, together form the intended exterior shape of the piece. To control the laser, for example to set its operating time and power output and to control the location of the target area of the laser beam within the surface area of the powder layer, it is expedient to store the data concerning the cross-sectional areas of the layers in a numerical or other form from which the laser control device can take them into use during sintering.

In this selective laser sintering (SLS), the powder blend is thus not pressed, at least not substantially, before the sintering, which is contrary to conventional sintering. However, before the laser sintering, the powder may be somewhat evened out and/or compacted either by using a roller or by vibration, or in some other corresponding manner which does not cause actual three-dimensional compression. The gas atmosphere in the chamber in which the sintering is carried out may be at atmospheric pressure or at a lower pressure or at a higher pressure, depending of the materials and other process conditions used at a given time.

In the method according to the invention, the first ingredient of the powder blend used is typically nickel powder in which the average particle size is at minimum 50 μm and at maximum 250 μm, preferably at maximum 150 μm. Typically the average particle size of the first ingredient is in the order of approximately 100 μm. The third ingredient is in the main bronze and/or brass or some other corresponding copper alloy having an average particle size substantially smaller than the average particle size of the iron-group metal of the first ingredient. Thus the average particle size of the third ingredient is at maximum 50 μm and preferably at maximum 30 μm. The second ingredient is copper phosphide $\alpha$-$Cu_3P$ having an average particle size at maximum equal to the average particle size of the first ingredient, but preferably in the same order of magnitude as the average size of the third ingredient. According to the invention, the third ingredient in an amount of 60–75% by weight, the second ingredient in an amount of 5–30% by weight, and the first ingredient in an amount of 10–30% by weight are blended for the said powder blend.

The first ingredient may be, besides nickel, also some other iron-group metal, such as cobalt or iron or a mixture of these. Its purpose is to form the non-melting ingredient of the blend to be sintered, at the same time forming a reinforcing phase. The purpose of the second ingredient, copper phosphide, $\alpha$-$Cu_3P$, which notation is used for an eutectic alloy of copper and phosphorus, is to form the completely melting and matrix-forming component of the metal blend to be sintered. Thus the powder blend to be sintered is heated by a laser beam in the target area of the beam to a temperature which is higher than the melting point of the second ingredient. If what is in question is a eutectic alloy of copper and phosphorus, $\alpha$-$Cu_3P$, its melting point is 714° C., and the temperature generated by the laser beam must be higher than this. If the ratio of copper to phosphorus is something else than this, the temperature generated by the laser beam must be respectively higher, the melting point of the compound $Cu_3P$, for example, being in the order of 1005°–1023° C. Here it should be taken into account that the proportion of copper in the bronze and/or brass in the blend evidently in practice affects the effective melting point by lowering it. Thus in practice the appropriate sintering temperatures must be determined experimentally. The value 800° C., or preferably 850° C., can in practice be taken as the lower limit for the temperature in order that sufficiently rapid sintering can be achieved.

In has been observed that, to attain the objects and advantages of the invention, it is expedient to achieve a partial dissolving of also the third ingredient, i.e. the copper alloy, in the melt forming the matrix. However, the third ingredient must not melt entirely. This goal is attained if the temperature generated in the target area by the laser beam is arranged to be such that it deviates by at maximum 100° C. upwards or downwards from the melting point of the third ingredient. Preferably this deviation is at maximum ±50° C., and typically ±30° C., from the melting point of the third ingredient. Even if the temperature generated by the laser beam in the target area is above the melting point of the third ingredient, this ingredient will not melt entirely, since the temperature difference is, in the manner stated above, small, and the heating time is short. In this case, attention should also be paid to the relative particle sizes of these ingredients, it being preferable that the average particle size of the third ingredient is greater than the average particle size of the second ingredient. If the temperature generated by the laser beam in the target area is lower than the melting point, the third ingredient cannot melt under its effect but some copper and/or other alloying elements will dissolve from it under the effect of the second ingredient, which is in molten state. In this case the ratio of the particle size of the second ingredient to that of the third ingredient is not of great significance. The tin, zinc and/or other alloying element of the copper alloy must, of course, be selected so that the melting point is suitably close to the melting point of the second ingredient. On the basis of experiments it seems that it is advantageous if the temperature generated by the laser beam is at maximum 950° C., preferably at maximum 900° C.

The gas atmosphere according to the invention, from which at least an iron-group metal is deposited pyrolytically, i.e. by chemical vapor deposition (CVD), into the regions heated by the laser beam during laser sintering, is in the most preferred embodiment made up of the carbonyl of the metal or metals concerned, such as nickeltetracarbonyl. The compound may also be a nitride, chloride, fluoride, iodide or bromide of the metal or metals concerned, or a mixture of these and/or carbonyls, or some other inorganic or organic compound, or a mixture thereof, which decomposes at the sintering temperature generated by the laser beam. In this procedure there is thus pyrolytically produced a metal or metals forming in the main a non-melting reinforcing phase in the sintered material. Preferably the iron-group metal deposited out from the gas atmosphere is the same iron-group metal or metals which is or which are used in the first ingredient of the powder blend. In this case there are deposited out from the gas phase, at least into the pores of the sintering material, particles which are similar to those already present as the reinforcing phase in the material. Thus the pores are filled with a reinforcing material, whereby the proportion of the reinforcing phase increases, increasing the strength of the metal piece produced as a result. Of course, there is no obstacle to the use of a compound of an iron-group metal other than that present in the powder, in which case the reinforcing phase deposited is an iron-group metal other than that produced by the powder. Furthermore, it is possible also to use in the gas atmosphere a compound of a metal even other than an iron-group metal, in such a manner that this other metal or these other metals will deposit, in addition to the iron-group metals, out from the gas atmosphere into the material being sintered, in which case the material sintered from the powder will be alloyed by the deposition. Otherwise this gas atmosphere surrounding the material being sintered is made up either solely of a gaseous compound or respectively gaseous compounds of an iron-group metal or metals, or of other metals, or of a compound of a metal or metals in a carrier gas. The carrier gas may be any gas suitable for the purpose, non-reactive under the conditions concerned.

In the method according to the invention it is important that no metal or other compound is deposited out from the gas atmosphere into regions other than those in which sintering takes place under the effect of the laser beam. According to the invention, the temperature of the regions to be retained in powder state can be maintained by cooling below the temperature at which any material can deposit out from the gas atmosphere. Those powder blend regions which are not to be sintered can be cooled, or be prevented from heating up, by cooling, by some suitable method known per se, the base onto which the powder material layers are introduced. Another possibility is to cool the gas atmosphere either by using a cooler in connection with the gas atmosphere or by circulating the gas via coolers or by introducing the gas in a cooled state and by discharging it. The purpose of all these steps is to maintain at maximum at 150° C. those regions of the powder blend which are not to be sintered. It is preferable during the laser sintering to maintain the said regions of the powder blend at maximum at a temperature of 80° C., or more preferably at a temperature below 40° C. There is no obstacle to cooling the powder by any of the methods referred to above or by a combination thereof to as low a temperature as possible, even below 0° C.

It is also possible to incorporate into the gas atmosphere a metal compound and/or non-metal compound which deposits at the sintering temperature and produces materials which alloy with the matrix-forming second ingredient, whereby reinforcing phases other than those mentioned above are obtained and/or the composition or structure of the matrix-forming material are otherwise changed. Thus it is possible to incorporate into the gas atmosphere a compound out of which there will deposit some ceramic or corresponding material, such as carbides, nitrides, borides and/or oxides, suitable for the reinforcing of a metal mixture.

I claim:

1. A method for the fabrication of dimensionally accurate metal pieces by sintering a material which, before the sintering, consists of a blend of at least three pulverous ingredients, the first ingredient being an iron-group metal, the second ingredient being copper and phosphorus, and the third ingredient being an alloy of copper and at least one other metal, this powder blend of ingredients containing the third ingredient in the largest amount and both the first ingredient and the second ingredient in smaller amounts, characterized by the following combination:

the shape of the piece is effected by layer-by-layer freeform selected area laser sintering, wherein a layer of the said powder blend is spread onto a base, those regions of the layer which correspond to this cross-sectional surface of the piece are heated to the sintering temperature by a laser beam, step by step, whereafter successive powder layers are spread one on top of another, in each of which those areas which correspond to the cross-sectional surface of the piece according to the layer concerned are laser sintered, and that the sintering is carried out in a gas atmosphere which contains a chemical compound, at least of an iron-group metal, which decomposes at the said sintering temperature, the iron-group metal depositing onto those areas of the cross-sectional surfaces of the piece which are being sintered at a given time.

2. A method according to claim 1, characterized in that the said chemical compound of an iron-group metal is metal carbonyl, hydride, chloride, fluoride, iodide or bromide, or some other pyrolytically decomposing metal compound, and that the iron-group metal in the said chemical compound is preferably the same metal, or any one of the metals, as is present in the first ingredient of the powder blend, or alternatively some other metal.

3. A method according to claim 1 or 2, characterized in that the first ingredient is at least nickel and the average particle size of the first ingredient is at minimum 50 μm and at maximum 250 μm, preferably in the order of 100 μm, that the third ingredient is bronze and/or brass having an average particle size at maximum 50 μm and preferably at maximum 30 μm, and that the second ingredient is copper phosphide having an average particle size at maximum equal to the average particle size of the first ingredient.

4. A method according to claim 1 or 2, characterized in that for the said powder blend there are mixed the third ingredient in an amount of approx. 60–75% by weight, the second ingredient in an amount of approx. 5–30% by weight, and the first ingredient in an amount of approx. 10–30% by weight, that the said gas atmosphere consists either of a gaseous compound of an iron-group metal and possibly other metal compounds, or of an iron-group metal compound and possibly other metal compounds in a carrier gas.

5. A method according to claim 1 or 2, characterized in that the powder blend is heated by the laser beam in its target areas to a temperature which is higher than the melting point of the second ingredient, that this temperature deviates by at maximum 100° C., preferably by at maximum 50° C., and typically by at maximum 30° C., in either direction from the melting point of the third ingredient, and that the said temperature produced by the laser beam is at maximum 950° C., preferably at maximum 900° C.

6. A method according to claim 1 or 2, characterized in that the decomposition of the iron-group metal compound present in the gas atmosphere elsewhere than in the laser-heated and thus sintering regions is prevented by cooling the base and/or by maintaining the temperature of the gas atmosphere in the area of the powder blend layers at a predetermined temperature, and that in those regions in which no sintering takes place the powder blend on the base is maintained at a temperature below 150° C., preferably at a temperature below 80° C., and typically at a temperature at maximum 40° C.

7. A method according to claim 6, characterized in that the temperature of the gas atmosphere is set at a predetermined value by means of gas circulation and/or gas exchange and/or cooling of the gas.

8. A method according to claim 1 or 2, characterized in that the first ingredient is a mixture of iron-group metals, and that in the first ingredient the said iron-group metal or mixture of iron-group metals additionally contains other metallic and/or nonmetallic alloying elements.

9. A method according to claim 1 or 2, characterized in that the gas atmosphere additionally comprises a chemical compound of a metal contained in the third ingredient, the chemical compound also decomposing at the sintering temperature, in which case the said metal or metals and/or non-metals and/or compounds will deposit into those areas of the cross-sectional surfaces of the piece which are being sintered at a given time.

10. A method according to claim 1, characterized in that the power and target area of the said laser are directed, in the layer-by-layer sintering of a powder blend and at the same time in the depositing of metal out from the gas phase, by computer or by numeric control, in which case the design for the piece has been sectioned into cross-sectional regions of the piece, corresponding to the thicknesses of the powder layers used, the regions together making up the form of the piece, these cross-sectional regions are stored in the memory for the said laser control, and the said control is implemented in accordance with these data stored in the memory.

* * * * *